(12) United States Patent
Lee et al.

(10) Patent No.: US 9,631,034 B2
(45) Date of Patent: Apr. 25, 2017

(54) NON-SUPPORTED HETEROGENEOUS POLYOLEFIN POLYMERIZATION CATALYST COMPOSITION AND METHOD FOR PREPARING SAME

(71) Applicant: LG CHEM, LTD., Seoul (KR)

(72) Inventors: Jin-Woo Lee, Daejeon (KR); Churl-Young Park, Daejeon (KR); Yeong-Ah Choi, Daejeon (KR); Nan-Young Lee, Seoul (KR); Dong-Gil Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/353,666

(22) PCT Filed: Nov. 2, 2012

(86) PCT No.: PCT/KR2012/009190
§ 371 (c)(1),
(2) Date: Apr. 23, 2014

(87) PCT Pub. No.: WO2013/066109
PCT Pub. Date: May 10, 2013

(65) Prior Publication Data
US 2015/0031844 A1    Jan. 29, 2015

(30) Foreign Application Priority Data

Nov. 3, 2011 (KR) .................. 10-2011-0114011
Jul. 31, 2012 (KR) .................. 10-2012-0084070

(51) Int. Cl.
*C08F 4/6592* (2006.01)
*C08F 4/642* (2006.01)
*C08F 10/00* (2006.01)
*C08F 4/659* (2006.01)

(52) U.S. Cl.
CPC ...... *C08F 4/65912* (2013.01); *C08F 4/65927* (2013.01); *C08F 10/00* (2013.01)

(58) Field of Classification Search
CPC .............. C08F 4/65912; C08F 4/65916; C08F 4/65927; C08F 10/00
See application file for complete search history.

(56) References Cited

U.S. PATENT DOCUMENTS 5,672,668 A * 9/1997 Winter .................. C07F 17/00
526/126

FOREIGN PATENT DOCUMENTS

| CN | 1910207 A | 2/2007 |
|---|---|---|
| JP | 63-501962 A | 8/1988 |
| JP | 2004-520476 A | 7/2004 |

(Continued)

*Primary Examiner* — Caixia Lu
(74) *Attorney, Agent, or Firm* — Dentons US LLP

(57) ABSTRACT

Disclosed is a metallocene catalyst composition for polyolefin polymerization. The metallocene catalyst composition is in a non-supported, heterogeneous form where an ansa-metallocene is bound to a cocatalyst without a support. Also, a method for preparing the catalyst composition, and a method for preparing polyolefin using the catalyst are disclosed. Capable of readily controlling microstructures of olefin polymers in addition to having high catalytic activity, the non-supported heterogeneous catalyst composition can be applied to the preparation of polyolefin polymers at high yield without altering preexisting processes.

6 Claims, 1 Drawing Sheet

▸ Tether Crosslinked

Forming an internal crosslink by an ion bond and coordinate bond

(56) References Cited

FOREIGN PATENT DOCUMENTS

| KR | 10-2000-0062706 A | 10/2000 |
|----|-------------------|---------|
| KR | 10-2006-0021476   | 3/2006  |
| KR | 10-2010-0067627   | 6/2010  |
| KR | 10-2011-0101386   | 9/2011  |
| KR | 10-2011-0117736   | 10/2011 |
| WO | 2004-087770 A1    | 10/2004 |
| WO | 2006-080817 A1    | 8/2006  |
| WO | 2010/128826 A2    | 11/2010 |

* cited by examiner

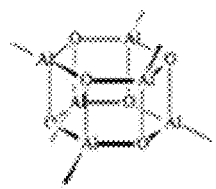 
Catalyst = 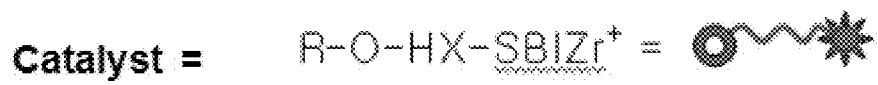
- Tether Crosslinked
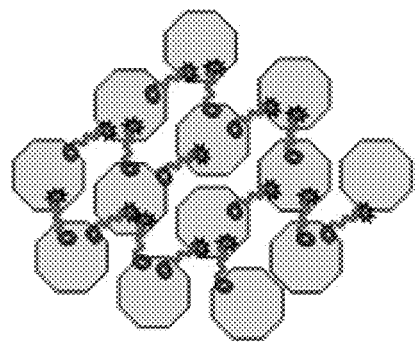
Forming an internal crosslink by an ion bond and coordinate bond

NON-SUPPORTED HETEROGENEOUS POLYOLEFIN POLYMERIZATION CATALYST COMPOSITION AND METHOD FOR PREPARING SAME

This application is a 35 USC §371 National Stage entry of International Application No. PCT/KR2012/009190, filed on Nov. 2, 2012, which claims priority from Korean Patent Application Nos. 10-2011-0114011, filed on Nov. 3, 2011 and 10-2012-0084070, filed on Jul. 31, 2012, in the Korean Intellectual Property Office, all of which are incorporated herein by reference in its entirety.

TECHNICAL FIELD

The present invention relates to a single-site catalyst composition without a support, and a method for preparing polyolefin using the same.

BACKGROUND ART

An ansa-metallocene is a catalytic compound containing two ligands that are linked by a bridging group. The link prevents rotation of the ligands and modifies the structure and reactivity of the metal center.

One potential application of ansa-metallocenes is in polymerization reactions for olefin homopolymers or copolymers. Particularly, ansa-metallocenes based on cyclopentadienyl-fluorenyl ligands have become of great significance in the polymerization of high-molecular weight polyethylenes with controlled microstructures. In addition, ansa-metallocenes containing indenyl ligands have excellent activity and can be used to produce polyolefins with high stereoregularity.

A metallocene, which is, per se, a complex soluble in a solvent, is a homogeneous catalyst. Meanwhile most Ziegler-Natta catalysts used in commercial manufacturing processes are of a heterogeneous type, with the active site metal on a solid support. Manufacturing processes are designed according to characteristics of Ziegler-Natta catalysts employed. For use in existing commercial manufacturing processes, metallocenes need transformation to a supported catalyst form in which a catalyst is affixed to a suitable support. Many studies have been reported on various supports and preparation methods of supported catalysts. Of them, many are directed to catalysts on supports such as silica, silica-alumina, and silica-magnesia.

Supported catalysts are a patent item of keen interest for commercialization. However, the application of metallocene catalysts to supports requires many troublesome processes, with the high likelihood of losing catalytic active sites depending on the states of the supports. In addition to this drawback, a limited amount of catalysts applied to supports results in low catalytic activity of the supported catalyst.

On the other hand, when a heterogeneous catalyst without a support is prepared by emulsion formation, a solvent, which is the third factor besides the catalytic factor and the cocatalyst, must be used, together with a surfactant, which may have adverse effects on the activity of the catalyst. A further disadvantage is the complicated process that a final catalyst product can only be separated by solidification following a separate emulsion formulation method.

DISCLOSURE

Technical Problem

An aspect of the present invention provides a non-supported heterogeneous polyolefin polymerization catalyst composition that can readily control microstructures of the olefin polymers in addition to being excellent in catalytic activity.

Another aspect of the present invention provides a method for preparing the non-supported heterogeneous polyolefin polymerization catalyst composition.

A further aspect of the present invention provides a method for preparing a polyolefin using the non-supported heterogeneous polyolefin polymerization catalyst composition.

Technical Solution

Provided in accordance with an aspect of the present invention is a non-supported heterogeneous polyolefin polymerization catalyst composition comprising an ansa-metallocene compound represented by the following Chemical Formula 1, and a cocatalyst represented by the following Chemical Formula 2.

[Chemical Formula 1]

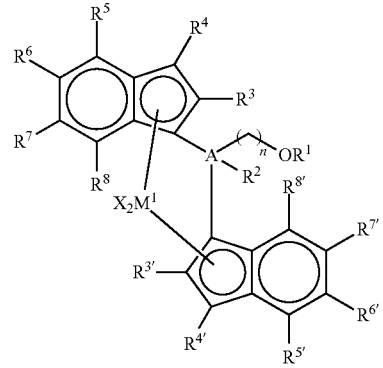

wherein, $M^1$ is a transition metal of Group 3 to 10 of the Periodic Table (IUPAC), or of an actinide or lanthanide; X's, which may be the same or different, are halogen; A is an element of Group 14 of the Periodic Table and functions as a bridging group linking two indenyl groups; $R^1$ is C1 to C20 alkyl, C2 to C20 alkenyl, C7 to C20 alkylaryl, C7 to C20 arylalkyl, or C6 to C20 aryl; $R^2$ is hydrogen or C1 to C20 alkyl, C2 to C20 alkenyl, C7 to C20 alkylaryl, C7 to C20 arylalkyl, or C6 to C20 aryl; $R^3$, $R^{3'}$, $R^4$, $R^{4'}$, $R^5$, $R^{5'}$, $R^6$, $R^{6'}$, $R^7$, $R^{7'}$, $R^8$, and $R^{8'}$, which may be the same or different, are independently hydrogen, or C1 to C20 alkyl, C2 to C20 alkenyl, C7 to C20 alkylaryl, C7 to C20 arylalkyl, or C6 to C20 aryl; and n is an integer of 1 to 20;

[Chemical Formula 2]

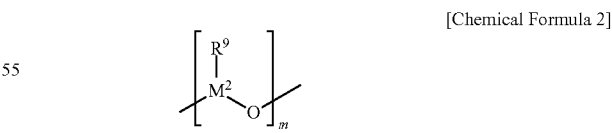

wherein, $M^2$ is a metal element of Group 13 of the Periodic Table; $R^9$'s, which may be the same or different, are independently C1 to C20 alkyl, C2 to C20 alkenyl, C7 to C20 alkylaryl, C7 to C20 arylalkyl, or C6 to C20 aryl; and m is an integer of 2 or larger.

Also, contemplated in accordance with another aspect of the present invention is a method for preparing the non-supported heterogeneous polyolefin polymerization catalyst composition.

In accordance with a further aspect thereof, the present invention provides a method for preparing a polyolefin, comprising polymerizing at least one kind of olefin monomer in the presence of the catalyst composition.

Hereinafter, embodiments will be given of the non-supported heterogeneous polyolefin polymerization catalyst composition, the preparation method thereof, and the preparation method of polyolefin using the catalyst composition. The preferred embodiments of the present invention have been disclosed for illustrative purposes, but not for limiting the present invention. Thus, those skilled in the art will appreciate that various modifications, additions and substitutions are possible, without departing from the scope and spirit of the invention as disclosed in the accompanying claims.

As used herein, the term "comprise" or "contain" refers to including a component (or constituent) without limitations, but must not be construed to exclude the addition of other components (or constituents).

The present invention pertains to a non-supported heterogeneous polyolefin polymerization catalyst composition with high catalytic activity which can be prepared by formulating a specific ansa-metallocene, together with a cocatalyst, to a heterogeneous form without a solid support in a method which is new, but does not require a change in conventional processes. Capable of readily controlling microstructures of olefin polymers in addition to having high catalytic activity, the catalyst composition of the present invention can be applied to the preparation of polyolefin polymers.

For use in catalyzing olefin polymerization, single site catalysts in various ligand forms become cationic through alkylation with cocatalysts, e.g., organic metal compounds. Currently, most commercial manufacturing processes for polyolefins take slurry polymerization, vapor-phase polymerization, or bulk polymerization. These commercial manufacturing processes employ single-site catalysts on various supports. Supported catalysts are obtained only after the application of catalytic active factors to supports through multi-step supporting reactions and separating procedures which take a long time. Together with limited amounts of both catalytic active sites and cocatalysts on supports, a loss of catalytic active sites which inevitably occurs in the application process results in a decrease in the catalytic activity of the final supported catalysts.

The present invention is configured to simplify the overall manufacturing process by omitting not only the application of catalytic active sites to supports, but also the separate activation of catalysts. In the present invention, therefore, granular catalysts with uniform activity can be obtained in a single process even without activating single-site catalysts and employing a support.

Leading to the present invention, intensive and thorough research into metallocene catalysts, conducted by the present inventors, resulted in the finding that ansa-metallocenes containing certain ligands and functional groups can be prepared, together with certain cocatalysts, to non-supported heterogeneous polyolefin polymerization catalyst compositions by themselves, without the aid of a separate solid support, and that the catalyst compositions guarantee the production of desired quality polyolefins.

Therefore, one aspect of the present invention envisages a non-supported heterogeneous polyolefin polymerization catalyst composition.

As used herein, the term "non-supported catalyst" refers to the form of catalysts wherein no supports are used for an ansa-metallocene and/or a cocatalyst, both responsible for catalytic activity. Here, this catalyst is used for the production of polyolefins. The term "heterogeneous catalyst," as used herein, refers to the form of catalysts where the phase of the catalyst differs from that of the reactants, as opposed to "homogeneous catalyst," which is a catalyst in the same phase as the reactants. In the present invention, the heterogeneous catalyst is not dissolved during the olefin polymerization, but is present, together with the polymer, in a different phase. Only heterogeneous catalysts can bring good morphology to the product and prevent reactor fouling.

In the non-supported heterogeneous polyolefin polymerization catalyst composition of the present invention, the ansa-metallocene represented by the following Chemical Formula 1 is associated with the cocatalyst represented by the following Chemical Formula 2:

[Chemical Formula 1]

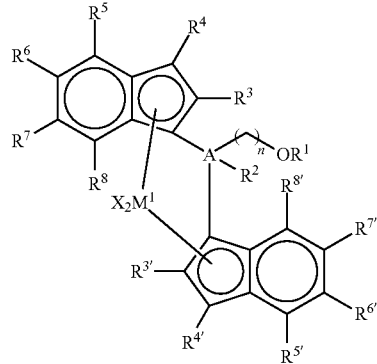

wherein, $M^1$ is a transition metal of Group 3 to 10 of the Periodic Table (IUPAC), or of an actinide or lanthanide; X's, which may be the same or different, are halogen; A is an element of Group 14 of the Periodic Table and functions as a bridging group linking two indenyl groups; $R^1$ is C1 to C20 alkyl, C2 to C20 alkenyl, C7 to C20 alkylaryl, C7 to C20 arylalkyl, or C6 to C20 aryl; $R^2$ is hydrogen or C1 to C20 alkyl, C2 to C20 alkenyl, C7 to C20 alkylaryl, C7 to C20 arylalkyl, or C6 to C20 aryl; $R^3$, $R^{3'}$, $R^4$, $R^{4'}$, $R^5$, $R^{5'}$, $R^6$, $R^{6'}$, $R^7$, $R^{7'}$, $R^8$, and $R^{8'}$, which may be the same or different, are independently hydrogen, or C1 to C20 alkyl, C2 to C20 alkenyl, C7 to C20 alkylaryl, C7 to C20 arylalkyl, or C6 to C20 aryl; and n is an integer of 1 to 20;

[Chemical Formula 2]

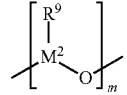

wherein, $M^2$ is a metal element of Group 13 of the Periodic Table; $R^9$'s, which may be the same or different, are independently C1 to C20 alkyl, C2 to C20 alkenyl, C7 to C20 alkylaryl, C7 to C20 arylalkyl, or C6 to C20 aryl; and m is an integer of 2 or larger.

In Chemical Formula 1, preferably, $R^1$ and $R^2$ are independently C1 to C4 alkyl; $R^3$ and $R^{3'}$ are independently hydrogen, C1 to C20 alkyl, C2 to C20 alkenyl, or C7 to C20 arylalkyl; $R^5$ and $R^{5'}$ are independently hydrogen, C6 to C20 aryl or C7 to C20 alkylaryl; $R^4$, $R^{4'}$, $R^6$, $R^{6'}$, $R^7$, $R^{7'}$, $R^8$, and $R^{8'}$ are each hydrogen; n is an integer of 1 to 6; and A is Si.

In the present invention, the ansa-metallocene has indenyl groups as ligands, and contains a bridging group which links the ligands and is substituted with an oxygen donor functioning as a Lewis base. Particularly, the ansa-metallocene of Chemical Formula 1 can exert maximal catalytic activity as it contains two indenyl groups as ligands linked by a bridging group which is substituted with an oxygen donor functioning as a Lewis base.

In a preferable exemplary embodiment, the ansa-metallocene of Chemical Formula 1 has an indenyl group as a ligand which is substituted with an alkyl group at position 2 and an aromatic compound at position 4. Further, the bridging group silane of the ansa-metallocene may be bound by an alkoxy tether group.

By recruiting an indenyl ligand, instead of a conventional ligand used in polyethylene polymerization, such as cyclopentyl or anthracene ligand, the ansa-metallocene according to the present invention can be effective in the production of polymers of higher stereoregularity, such as polypropylenes.

On the other hand, the cocatalyst of the non-supported heterogeneous polyolefin polymerization catalyst composition forms a Lewis acid/base bond with the bridging group of the ansa-metallocene.

In Chemical Formula 2 for the cocatalyst, preferably, $R^9$'s are independently methyl, ethyl, propyl, isopropyl, isopropenyl, n-butyl, sec-butyl, tert-butyl, pentyl, hexyl, octyl, decyl, dodecyl, tridecyl, tetradecyl, pentadecyl, hexadecyl, octadecyl, eicosyl, docosyl, tetracosyl, cyclohexyl, cyclooctyl, phenyl, tolyl, or ethylphenyl; and $M^2$ is aluminum.

In Chemical Formula 2, m is an integer of 2 or larger, e.g., 2 to 500, preferably, 6 or larger, or 6 to 300, and more preferably 10 or larger or 10 to 100.

As mention above, the cocatalyst of Chemical Formula 2 contains a metal element which functions as a Lewis acid, forming a bond with the functional group introduced to the bridging group of the ansa-metallocene of Chemical Formula 1. The cocatalyst of Chemical formula 2 may be in a linear, circular or network form, and its examples include methylaluminoxane, ethylaluminoxane, propylaluminoxane, butylaluminoxane, tetraisobutyldialuminoxane, and tetraethyldialuminoxane. The cocatalyst may be of a linear, circular or network structure.

In the present invention, the cocatalyst accelerates the single site catalyst which is thus made ready to catalyze polymerization, while concomitantly reacting with the functional group, such as alkoxy, substituted on the bridging group, thereby assigning the final catalyst composition as solid particles without additional supports. In other words, the cocatalyst not only activates the catalyst, but also plays as a crosslinker to some degree to cause the catalyst composition to precipitate as particles, whereby the catalyst composition can be readily obtained in a non-supported, heterogeneous state. Hence, the final catalyst composition according to the present invention is a solid particle. For example, dropwise adding or one-shot dropping of a cocatalyst, such as methyl aluminoxane, to a solution of the catalyst precursor ansa-metallocene in toluene allows particles to precipitate, followed by removal of the toluene to afford a catalyst in a solid phase even without a separate support.

In spite of no supports, the non-supported heterogeneous polyolefin polymerization catalyst composition of the present invention can be obtained as size-controlled particles in a simple process without a multiple of decantation and washing steps, and can exert excellent catalytic effects upon polymerization without generating fouling.

In the non-supported heterogeneous polyolefin polymerization catalyst composition of the present invention, as described above, the ansa-metallocene forms a Lewis acid/base bond with at least a part of the cocatalyst. In addition, the non-supported heterogeneous polyolefin polymerization catalyst composition may further comprise a cocatalyst which is not involved in the formation of the Lewis acid/base bond. The cocatalyst, whether in a Lewis acid/base bond, acts in synergy with the ansa-metallocene, eliciting excellent catalyst activity even in the absence of a support.

Meanwhile, the transition metal element ($M^1$) of the ansa-metallocene and the metal element ($M^2$) of the cocatalyst may be at a molar ratio ($M^2/M^1$) of 70 to 500, preferably at a molar ratio ($M^2/M^1$) of 250 to 480, and more preferably at a molar ratio ($M^2/M^1$) of 300 to 450. For example, when the molar ratio ($M^2/M^1$) is below 70, the cocatalyst may play an insufficient role in activating the catalyst. On the other hand, a molar ratio ($M^2/M^1$) exceeding 500 may give rise to excessive crosslinking to the degree of uncontrolled particle sizes, which is prone to cause problems with catalyst introduction and polymer morphology.

The non-supported heterogeneous polyolefin polymerization catalyst composition of the present invention is characterized by the crosslink between the functional group introduced to the bridging group of the metallocene of Chemical Formula 1 and the metal element of the cocatalyst of Chemical Formula 2 through Lewis acid/base interaction. Particularly, the catalyst composition of the present invention may be obtained as a non-supported heterogeneous form in which the catalyst compound ansa-metallocene and the cocatalyst compound methylaluminoxane (MAO) are in an internal crosslink relationship by forming a Lewis acid/base bond, more particularly, an ion bond/coordinate bond therebetween, as shown in FIG. 1. In one embodiment, therefore, the present invention provides a non-supported heterogeneous polyolefin polymerization catalyst composition in which a coordinate bond, such as a Lewis acid/base bond, is formed as shown in the following Chemical Formula 3:

[Chemical Formula 3]

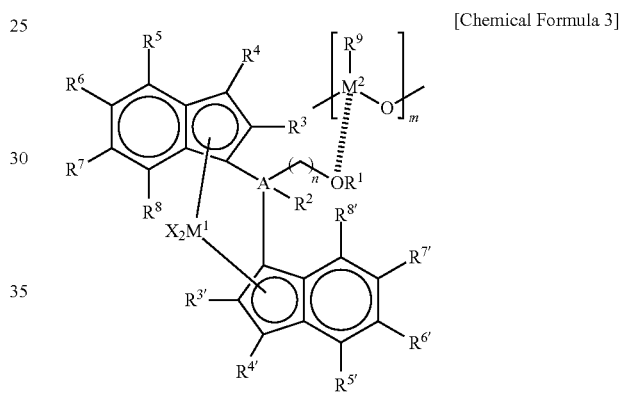

wherein, $M^1$, $M^2$, X, A, $R^1$, $R^2$, $R^3$, $R^{3'}$, $R^4$, $R^{4'}$, $R^5$, $R^{5'}$, $R^6$, $R^{6'}$, $R^7$, $R^{7'}$, $R^8$, $R^{8'}$, $R^9$, n, and m are as described above.

Conventional supported metallocene catalysts are prepared by, for example, impregnating silica with various organic metal compound cocatalysts and then with an ansa-metallocene catalyst to alkylate the metal moiety of the cocatalysts, followed by the cationization of the metal moiety to create an active species. However, the non-supported heterogeneous polyolefin polymerization catalyst composition of the present invention, as described above, is not only catalytically activated by the specific cocatalyst, but also precipitates as particles, although free of supports, as a result of the bonding of the cocatalyst of the functional group on the bridging group of the metallocene, as shown in Chemical Formula 3. In other words, the non-supported heterogeneous polyolefin polymerization catalyst composition of the present invention is prepared by crosslinking the metallocene with the cocatalyst via a Lewis acid/base bond.

As described above, the non-supported heterogeneous polyolefin polymerization catalyst composition according to the present invention is characterized in that the catalyst composition itself becomes heterogeneous as the specific metallocene compound reacts with the cocatalyst without using a support. In one embodiment of the catalyst composition of the present invention, the —$OR^1$ functional group of the ansa-metallocene of Chemical Formula 1 is bound to the metal element of the cocatalyst as a result of a Lewis acid/base reaction. As such, a non-support heterogeneous catalyst is produced in a simple process without using a support, and exhibits high catalyst activity for polyolefin polymerization. In addition, the non-supported heterogeneous polyolefin polymerization catalyst composition of the present invention can be properly applied to slurry, bulk, or vapor-phase polymerization, and the polyolefins prepared in the presence of the heterogeneous catalyst which is supported by itself without a support are superior in morphology and apparent density.

Moreover, the non-supported heterogeneous polyolefin polymerization catalyst composition may be in the form of solid particles with an average diameter of 20 μm to 200 μm, preferably 30 μm to 170 μm, and more preferably 40 μm to 150 μm. For example, given an average weight less than 20 μm, the catalyst is likely to generate fine powders and particles within the polymer. On the other hand, when the average diameter exceeds 200 μm, it is difficult to control the reaction temperature upon polymerization, with the consequent high likelihood of fouling and inferior morphology.

According to one embodiment of the present invention, the non-supported heterogeneous polyolefin polymerization catalyst composition employs methylaluminoxane as a cocatalyst with a connection to an alkoxy tether substituted on the silane bridge. For this, methylaluminoxane may be slowly dropwise added to the single site catalyst having an alkoxy tether in toluene so as to control the reaction rate. Thus, the employment of no supports can simplify the overall process, reduce the production cost at least in terms of support expense, and prevent the reduction of catalyst activity caused by the application of a catalyst to the support.

In accordance with another aspect thereof, the present invention provides a method for preparing the non-supported heterogeneous polyolefin polymerization catalyst composition. The preparation method of the non-supported heterogeneous polyolefin polymerization catalyst composition may comprise reacting an ansa-metallocene represented by the following Chemical Formula 1 with a cocatalyst represented by the following Chemical Formula 2:

[Chemical Formula 1]

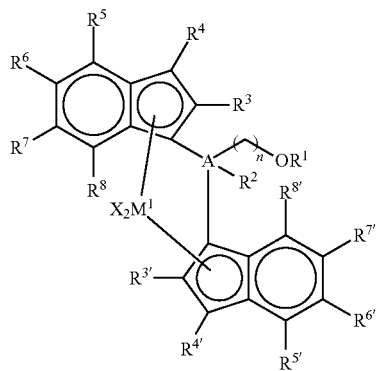

$M^1$ is a transition metal of Group 3 to 10 of the Periodic Table (IUPAC), or of an actinide or lanthanide; X's, which may be the same or different, are halogen; A is an element of Group 14 of the Periodic Table and functions as a bridging group linking two indenyl groups; $R^1$ is C1 to C20 alkyl, C2 to C20 alkenyl, C7 to C20 alkylaryl, C7 to C20 arylalkyl, or C6 to C20 aryl; $R^2$ is hydrogen or C1 to C20 alkyl, C2 to C20 alkenyl, C7 to C20 alkylaryl, C7 to C20 arylalkyl, or C6 to C20 aryl; $R^3$, $R^{3'}$, $R^4$, $R^{4'}$, $R^5$, $R^{5'}$, $R^6$, $R^{6'}$, $R^7$, $R^{7'}$, $R^8$, and $R^{8'}$, which may be the same or different, are independently hydrogen, or C1 to C20 alkyl, C2 to C20 alkenyl, C7 to C20 alkylaryl, C7 to C20 arylalkyl, or C6 to C20 aryl; and n is an integer of 1 to 20;

[Chemical Formula 2]

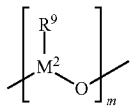

wherein, $M^2$ is a metal element of Group 13 of the Periodic Table; $R^9$'s, which may be the same or different, are independently C1 to C20 alkyl, C2 to C20 alkenyl, C7 to C20 alkylaryl, C7 to C20 arylalkyl, or C6 to C20 aryl; and m is an integer of 2 or larger.

Details for the metallocene, the cocatalyst, Chemical Formulae 1 to 3, and substituents thereof are as described above.

The transition metal element ($M^1$) of the ansa-metallocene and the metal element ($M^2$) of the cocatalyst may be at a molar ratio ($M^2/M^1$) of 70 to 500, preferably at a molar ratio ($M^2/M^1$) of 250 to 480, and more preferably at a molar ratio ($M^2/M^1$) of 300 to 450. For example, when the molar ratio ($M^2/M^1$) is below 70, the cocatalyst may play an insufficient role in activating the catalyst. On the other hand, a molar ratio ($M^2/M^1$) exceeding 500 may give rise to excessive crosslinking to the degree of uncontrolled particle sizes, which is prone to cause problems with catalyst introduction and polymer morphology.

In the present invention, as described above, the ansa-metallocene forms a Lewis acid/base bond with at least a part of the cocatalyst. In addition, the non-supported heterogeneous polyolefin polymerization catalyst composition may further comprise a cocatalyst which is not involved in the formation of the Lewis acid/base bond. The cocatalyst, whether in a Lewis acid/base bond, acts in synergy with the ansa-metallocene, eliciting excellent catalyst activity even in the absence of a support.

For use in the reaction therebetween, the ansa-metallocene or the cocatalyst may be dissolved in an organic solvent selected from the group consisting of toluene, xylene, methylene chloride, ethyl acetate, ethyl ether, hexane, and a combination thereof. Preferable is toluene or xylene. The organic solvent may be used in such an amount as to dissolve the metallocene or the cocatalyst, fully considering a desired morphology of the catalyst. For example, the organic solvent may be used at a concentration of 0.1 g/cm³ or less, or at a concentration of 0.1 mg/cm³ to 0.1 g/cm³, preferably at a concentration of 0.05 g/cm³ or less, and more preferably at a concentration of 0.01 mg/cm³ or less.

The addition of the cocatalyst to a solution of the ansa-metallocene in an organic solvent may be conducted in a dropwise adding manner using a syringe pump, which is particularly advantageous in terms of morphology. The adding rate may be on the order of 10 cc/min or less, or on the order of 0.2 to 10 cc/min, preferably on the order of 5 cc/min or less, and more preferably on the order of 1 cc/min or less. The dropwise adding rate may be controlled so as to maintain the overall process efficiently. However, if the adding rate is too fast, for example, exceeds 10 cc/min, the reaction rapidly proceeds to produce too large a catalyst particle. In this case, the catalyst is troublesome when introduced to the reactor upon polymerization, and assigns a wide size distribution to the polymers.

Typical processes employed in the art may be also conducted prior to or subsequent to the above-mentioned processes, and it should be noted that the preparation method of present invention is not limited by the above-mentioned processes.

In accordance with a further aspect thereof, the present invention provides a method for preparing polyolefin, comprising polymerizing an olefin monomer in the presence of the non-supported heterogeneous catalyst composition.

Particularly, as described above, the heterogeneous metallocene catalyst in a solid particle phase, prepared by reacting the specific ansa-metallocene compound with the cocatalyst compound, can be applied to olefin polymerization, for example, propylene polymerization. The catalyst exhibits much higher catalyst activity, compared to a conventional catalyst on a support while producing polymers without fouling.

The olefin monomer may be selected from the group consisting of ethylene, propylene, 1-butene, 1-pentene, 1-hexene, 4-methyl-1-pentene, 1-octene, 1-decene, 1-dodecene, 1-tetradecene, 1-hexadecene, 1-octadecene, 1-eicosene, and a combination thereof.

The olefin polymerization may be performed at a temperature of 25 to 500° C. under a pressure of 10 to 100 kgf/cm$^2$ for 1 to 24 hrs. The reaction temperature for the polymerization may preferably range from 25 to 200° C. (Celsius degree) and more preferably from 50 to 100° C. As for the polymerization pressure, it range is preferably from 1 to 70 kgf/cm$^2$ and more preferably from 5 to 40 kgf/cm$^2$. The polymerization time may be preferably 1 to 5 hrs and more preferably 1 to 2 hrs.

On the other hand, the polymerization process is designed to adjust the molecular weight of the final polymer product depending on the presence or absence of hydrogen. Particularly, in a hydrogen-free condition, high-molecular weight polyolefins can be prepared. On the other hand, even in the presence of a small amount of hydrogen, low-molecular weight polyolefins can be obtained. In this regard, the hydrogen content used in the polymerization may range from 0.07 L to 4 L under 1 atm of the reactor, or hydrogen may be supplied at a pressure of 1 bar to 40 bar or at a molar ratio to olefin monomer of 168 ppm to 8,000 ppm.

The polyolefin prepared using the non-supported heterogeneous polyolefin polymerization catalyst composition of the present invention may be higher in molecular weight than that prepared using a conventional metallocene catalyst. Particularly, the polyolefin prepared in the presence of the non-supported heterogeneous polyolefin polymerization catalyst composition in a hydrogen-free condition may have a weight average molecular weight (Mw) of 200,000 or greater, or from 200,000 to 600,000, preferably 250,000 or greater, and more preferably 300,000 or greater. On the other hand, when a polymerization process is conducted using the non-supported heterogeneous polyolefin polymerization catalyst composition of the present invention in a hydrogen condition, for example, when 0.37 L of hydrogen is added under the 1 atm of the reactor, the polyolefin may has a weight average molecular weight (Mw) of 90,000 or less, or from 55,000 to 90,000, preferably 85,000 or less, and more preferably 80,000 or less.

As such, low- or high-molecular weight polyolefins can be selectively prepared in the presence of the non-supported heterogeneous polyolefin polymerization catalyst composition of the present invention, depending on the content of hydrogen.

The polyolefin prepared by the method has a molecular weight distribution (Mw/Mn) of 1 to 4, and preferably 1.2 to 3.5, and more preferably 1.5 to 3.

Moreover, when expressed as the weight (kg) of the product per weight (g) of the catalyst per unit time (h), the non-supported heterogeneous polyolefin polymerization catalyst composition of the present invention exhibits a polymerization rate of 6.0 kg/gCat·hr or higher or 6.0 to 50 kg/gCat·hr, preferably 7.0 kg/gCat·hr or higher, and more preferably 8.0 kg/gCat·hr or higher.

The polyolefin may have a stereoregularity (XI) of 90% or higher, preferably 92% or higher, and more preferably 95% or higher. In this regard, the stereoregularity (XI) is calculated according to the following Equation.

$$\text{Stereoregularity}(XI) = 100 - Xs \quad \text{[Equation 1]}$$

$$Xs = \left( \frac{Vbo}{Vb1} \times (W2 - W1) - \frac{Vbo}{Vb2} \times B \right) \Big/ Wo \times 100$$

wherein,
Xs=soluble fraction of a polymer in o-xylene (wt %),
Vb0=initial volume of o-xylene (mL),
Vb1=volume of sample taken from the polymer dissolved in o-xylene (mL),
Vb2=volume of o-xylene sample used in the blank test (mL),
W2=weight of the polymer left on the aluminum pan after evaporation of o-xylene plus weight of the aluminum pan itself (g),
W1=weight of the aluminum pan (g),
W0=initial weight of polymer (g), and
B=average weight of the residue on the aluminum pan in the blank test (g)

It should be apparent to those skilled in the art that although many specified elements such as concrete components are elucidated in the following description, they are intended to aid the general understanding of the invention and the present invention can be implemented without the specified elements. Further, in the description of the present invention, when it is determined that the detailed description of the related art would obscure the gist of the present invention, the description thereof will be omitted.

Advantageous Effects

The non-supported heterogeneous polyolefin polymerization catalyst composition of the present invention comprising a specific ansa-metallocene and a specific cocatalyst can be used per se as a catalyst for catalyzing polyolefins. Capable of readily controlling microstructures of olefin polymers in addition to having high catalytic activity, the catalyst composition of the present invention can be applied to the preparation of polyolefin polymers. The catalyst composition of the present invention is far superior in catalyst activity to a conventional catalyst in which a metallocene and a cocatalyst are supported to a support.

DESCRIPTION OF DRAWINGS

FIG. 1 is a schematic view of a non-supported heterogeneous polyolefin polymerization catalyst composition in which an ansa-metallocene catalyst forms an ionic bond and coordinate bond with a cocatalyst, thereby establishing an internal crosslink.

MODE FOR INVENTION

A better understanding of the present invention may be obtained through the following examples which are set forth to illustrate, but are not to be construed as limiting the present invention.

Example 1

A non-supported heterogeneous polyolefin polymerization catalyst composition was prepared as follows.

Synthesis of Metallocene

Step 1: Synthesis of (6-t-Butoxyhexyl)Dichloromethylsilane

To 100 mL of a trichloromethylsilane solution (ca. 0.21 mol, hexane) was slowly dropwise added 100 mL of a t-butoxyhexyl magnesium chloride solution (ca. 0.14 mol, ether) at −100° C. for 3 hrs, followed by stirring at room temperature for 3 hr.

After being withdrawn from the solution mixture, a transplant organic layer thus formed was dried in a vacuum, and the removal of excess trichloromethylsilane afforded (6-t-butoxyhexyl)dichloromethylsilane as a transparent liquid (yield 84%).

$^1$H NMR (500 MHz, CDCl$_3$, 7.24 ppm): 0.76 (3H, s), 1.11 (2H, t), 1.18 (9H, s), 1.32~1.55 (8H, m), 3.33 (2H, t)

Step 2: Synthesis of (6-t-butoxyhexyl)(methyl)-bis (2-methyl-4-phenylindenyl)silane To 77 mL of a 2-methyl-4-phenylindene toluene/ THF=10/1 solution (34.9 mmol) was slowly added drops of 15.4 mL of an n-butyllithium solution (2.5 M, hexane) at 0° C., followed by stirring the reaction mixture at 80° C. for 1 hr and then overnight at room temperature. Thereafter, this reaction mixture was slowly added at −78° C. with drops of 5 g of (6-t-butoxyhexyl)dichloromethylsilane prepared in step 1, and the resulting mixture was stirred for 10 min, and then for 80° C. for 1 hr. After washing with water, the organic layer thus formed was purified by silica column chromatography, and dried in a vacuum to afford the title compound as a yellow oil: Yield 78% (racemic:meso=1:1)
$^1$H NMR (500 MHz, CDCl$_3$, 7.24 ppm): 0.10 (3H, s), 0.98 (2H, t), 1.25 (9H, s), 1.36~1.50 (8H, m), 1.62 (8H, m), 2.26 (6H, s), 3.34 (2H, t), 3.81 (2H, s), 6.87 (2H, s), 7.25 (2H, t), 7.35 (2H, t), 7.45 (4H, d), 7.53 (4H, t), 7.61 (4H, d)

Step 3: Synthesis of [(6-t-butoxyhexylmethylsilane-diyl)-bis(2-methyl-4-phenylindenyl)]zirconium dichloride To 50 mL of (6-t-butoxyhexyl)(methyl)bis(2-methyl-4-phenyl)indenylsilane ether/hexane=1/1 (3.37 mmol) was dropwise added 3.0 mL of n-butyllithium (2.5 M in hexane) at −78° C., followed by stirring at room temperature and then by drying in a vacuum. Subsequently, the resulting salt was washed with hexane, filtered and dried in a vacuum to give a yellowish solid. The ligand salt prepared in a glove box, and bis(N,N'-diphenyl-1,3-propanediamido)dichlorozirconium bis(tetrahydrofuran) [Zr (C$_5$H$_6$NCH$_2$CH$_2$CH$_2$NC$_5$H$_6$)Cl$_2$(C$_4$H$_8$O)$_2$] were weighed and placed in a Schlenk flask to which ether drops were then slowly introduced at −78° C. before stirring at room temperature for 3 hrs. Filtration and then vacuum drying afforded the metallocene of the following Chemical Formula 4 as an orange solid (R$^1$=t-Bu; R$^2$=CH$_3$; R$^3$, R$^{3'}$=CH$_3$; R$^5$, R$^{5'}$=Ph): yield 85% (racemic:meso=10:1).

This metallocene, unless supported, corresponded to a homogeneous catalyst when it was dissolved in an organic solvent such as toluene.
$^1$H NMR (500 MHz, C$_6$D$_6$, 7.24 ppm): 1.19 (9H, s), 1.32 (3H, s), 1.48~1.86 (10H, m), 2.25 (6H, s), 3.37 (2H, t), 6.95 (2H, s), 7.13 (2H, t), 7.36 (2H, d), 7.43 (6H, t), 7.62 (4H, d), 7.67 (2H, d)

[Chemical Formula 4]

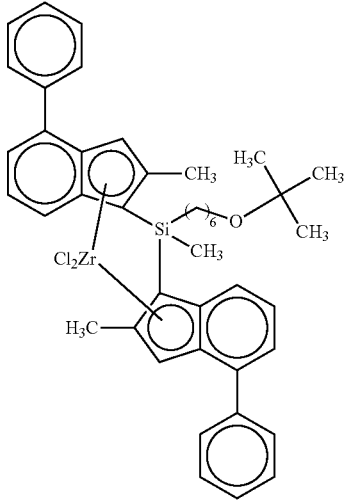

Preparation of Non-Supported Heterogeneous Catalyst Composition

In a Schlenk flask containing 25 mL of toluene, 120 µmol of the metallocene prepared above was placed, and dissolved with stirring under an argon atmosphere.

To the Schlenk flask, 45 mmol of methylaluminoxane (MAO, R$^9$=methyl in Chemical Formula 2) was dropwise added over 1 hr at a rate of 0.5 cc/min using a syringe pump, followed by reacting for 24 hrs at room temperature in an argon atmosphere.

In this regard, the molar ratio between metal elements of the metallocene and the methylaluminoxane (Al/Zr) was assigned with 375. During the reaction, the heterogeneous metallocene catalyst precipitated, after which the supernatant was removed.

Afterwards, the precipitate was washed with toluene and then with hexane, and dried in a vacuum for 2 hrs to afford 0.27 g of a non-supported heterogeneous metallocene catalyst composition in the form of powder particles with an average diameter of 50 µm.

As such, the non-supported heterogeneous metallocene catalyst composition can be prepared only by activation with a cocatalyst, even without using a separate support.

Example 2

A non-supported heterogeneous metallocene catalyst (0.27 g) was prepared into powder particles with an average diameter of 150 µm using no supports in the same manner as in Example 1, with the exception that methylaluminoxane (MAO) was added in a one-shot pattern, instead of in a dropwise mode, to the Schlenk flask containing a solution of the metallocene.

Comparative Example 1

A non-supported heterogeneous metallocene catalyst was prepared in the same manner as in Example 2, with the exception that triethylaluminum (TEA), instead of methylaluminoxane (MAO), was used as a cocatalyst, and the molar ratio between metal elements of the metallocene and the triethylaluminum (TEA) (Al/Zr) was assigned with 50. The catalyst obtained was not in the form of particles.

Comparative Example 2

A non-supported heterogeneous metallocene catalyst was prepared in the same manner as in Example 2, with the exception that triisobutylaluminum (TIBA), instead of methylaluminoxane (MAO), was used as a cocatalyst, and the molar ratio between metal elements of the metallocene and the triisobutylaluminum (TIBA) (Al/Zr) was assigned with 250. The catalyst obtained was not in the form of particles.

Comparative Example 3

A polyolefin polymerization catalyst composition supported on silica was prepared using the ansa-metallocene of Chemical Formula 4 as follows.

Synthesis of Metallocene

[(6-t-Butoxyhexylmethylsilane-diyl)-bis(2-methyl-4-phenylindenyl)]zirconium dichloride was synthesized in the same manner as in Example 1.

Preparation of Silica-Supported Catalyst Composition

To a Schlenk flask where silica weighing 3 g was placed, 52 mmol of methylaluminoxane (MAO) was added in a one-shot mode, followed by reaction at 90° C. for 24 hrs. After completion of the reaction, the supernatant was removed and the precipitate thus formed was washed twice with toluene to yield 3 g of silica on which methylaluminoxane (MAO) was supported.

A solution of 240 µmol of the above-synthesized metallocene, that is, [(6-t-butoxyhexylmethylsilane-diyl)-bis(2- methyl-4-phenylindenyl)]zirconium dichloride in 50 mL of toluene was reacted at 40° C. for 5 hrs with the silica support on which methylaluminoxane (MAO) was supported. After completion of the reaction, the supernatant was removed, and the precipitate was washed with toluene and hexane, twice each. In this regard, the molar ratio between the metal elements of the metallocene and the silica-supported methylaluminoxane (Al/Zr) was assigned with 215. Vacuum drying yielded 5 g of a silica-supported metallocene catalyst composition in the form of power particles with an average diameter of 30 μm.

Comparative Example 4

After triethylaluminum (TEA) was used as a cocatalyst and the molar ratio between metal elements of the metallocene and the triethylaluminum (TEA) (Al/Zr) was assigned with 50 as in Comparative Example 1, 5 g of a silica-supported metallocene catalyst composition was prepared in the form of powder particles with an average diameter of 30 μm in the same manner as in Comparative Example 3, with the exception that the methylaluminoxane (MAO) was supported on silica (Al/Zr=215).

Comparative Example 5

After triisobutylaluminum (TIBA) was used as a cocatalyst and the molar ratio between metal elements of the metallocene and the triethylaluminum (TEA) (Al/Zr) was assigned with 25 as in Comparative Example 1, 5 g of a silica-supported metallocene catalyst composition was prepared in the form of powder particles with an average diameter of 30 μm in the same manner as in Comparative Example 3, with the exception that the methylaluminoxane (MAO) was supported on silica (Al/Zr=215).

Comparative Example 6

A polyolefin polymerization catalyst composition was prepared in the same manner as in Comparative Example 3, with the exception that the ansa-metallocene of the following Chemical Formula 5 was employed.

[Chemical Formula 5]

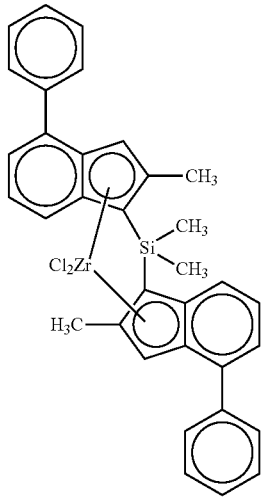

Synthesis of Metallocene

Step 1: Synthesis of dimethylbis(2-methyl-4-phenylindenyl)silane

To 77 mL of a 2-methyl-4-phenylindene toluene/THF=10/1 solution (49.5 mmol) was slowly dropwise added 21.8 mL of an n-butyllithium solution (2.5 M, hexane) at 0° C., followed by stirring at 80° C. for 1 hr and then overnight at room temperature. Thereafter, this reaction mixture was slowly added at 0° C. or lower with drops of 2.98 mL of dichloromethylsilane, and the resulting mixture was stirred for 10 min, and then for 80° C. for 1 hr. After washing with water, the organic layer thus formed was purified by silica column chromatography, and dried in a vacuum to afford the title compound as a yellow oil: Yield 61% (racemic:meso=1:1)

$^1$H NMR (500 MHz, CDCl$_3$, 7.24 ppm): 0.02 (6H, s), 2.37 (6H, s), 4.00 (2H, s), 6.87 (2H, t), 7.38 (2H, t), 7.45 (2H, t), 7.57 (4H, d), 7.65 (4H, t), 7.75 (4H, d)

Step 2: Synthesis of [dimethylsilanediylbis(2-methyl-4-phenylindenyl)]zirconium dichloride To 240 mL of dimethylbis(2-methyl)bis(2-methyl-4-phenylindenyl)silane ether/hexane=1/1 (3.37 mmol) was dropwise added 3.0 mL of n-butyllithium (2.5 M in hexane) at −78° C. This reaction mixture was stirred overnight at room temperature, and dried in a vacuum to give a pale yellow solid. The ligand salt prepared in a glove box, and bis(N, N'-diphenyl-1,3-propanediamido)dichlorozirconiumbis(tetrahydrofuran) were weighed and placed in a Schlenk flask to which ether drops were then slowly introduced at −78° C. before stirring overnight at room temperature. The red solution was separated by filtration, dried in a vacuum, and mixed with toluene/ether=1/2. The resulting clear red solution was slowly added with drops of 1.5~2 equivalents of HCl ether (1 M) at −78° C., and then stirred at room temperature for 3 hrs. Subsequently, filtration and vacuum drying afforded the metallocene of Chemical Formula 5 as an orange solid: yield 70% (racemic only).

$^1$H NMR (500 MHz, C$_6$D$_6$, 7.24 ppm): 1.32 (6H, s), 2.24 (6H, s), 6.93 (2H, s), 7.10 (2H, t), 7.32 (2H, t), 7.36 (2H, d), 7.43 (4H, t), 7.60 (4H, d), 7.64 (2H, d)

Preparation of Silica-Supported Catalyst Composition

With the exception that the metallocene of Chemical Formula 5 was used, the same procedure as in Comparative Example 3 was repeated to yield 5 g of a silica-supported metallocene catalyst in the form of powder particles with an average diameter of 30 μm.

Comparative Example 7

A polyolefin polymerization catalyst composition was prepared in the same manner as in Comparative Example 3, with the exception that the ansa-metallocene of the following Chemical Formula 6 was employed.

[Chemical Formula 6]

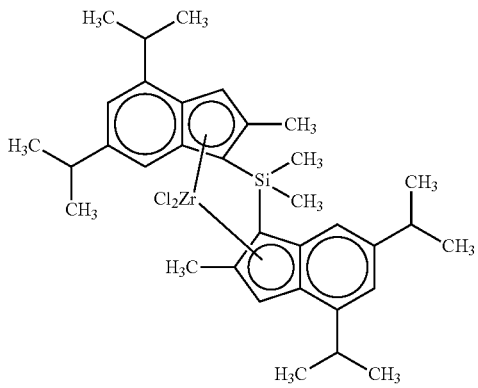

Synthesis of Metallocene

Step 1: Preparation of methylbis(2-methyl-4,6-diisopropylindenyl)silane

To 10 mL of a 2-methyl-4,6-isopropylindene solution (3.45 mmol in ether) was slowly dropwise added 7.83 mL of an n-butyllithium solution (2.5 M in hexane) at 0° C., followed by stirring the reaction mixture at room temperature for about 3 hrs. Subsequently, the reaction mixture was slowly added at 0° C. or lower with drops of 0.2 mL of dichloromethylsilane, and stirred for about 10 min and then at room temperature for 3 hrs. Filtration and vacuum drying afforded dimethylbis(2-methyl-4,6-diisopropylindenyl)silane.

$^1$H NMR (500 MHz, CDCl$_3$, 7.24 ppm): 0.39 (6H, s), 1.30~1.23 (24H, m), 2.25 (6H, m), 2.91 (2H, q), 3.18 (2H, q), 3.53 (2H, s), 6.71 (2H, s), 6.95 (2H, s), 7.14 (2H, s)

Step 2: Preparation of [dimethylsilanediylbis(2-methyl-4,6-diisopropylindenyl)]zirconium dichloride After slow addition of 2.3 mL of an n-butyllithium solution (2.5 M in hexane) to 10 mL of a dimethylbis(2-methyl-4,6-diisopropylindenyl)silane solution (2.55 mmol in ether) at 0° C., the reaction mixture was stirred for about 4 hrs and dried in a vacuum. The salt thus formed was washed with hexane, filtered, and dried in a vacuum to give a white solid. This was dissolved in toluene and dimethoxyethane, and mixed with a ZrCl$_4$ toluene slurry at −78° C. before stirring at room temperature for about 3 hrs. After vacuum drying, the residue was dissolved in hexane and filtered at a low temperature to afford [dimethylsilanediylbis(2-methyl-4,6-diisopropylindenyl)]zirconium dichloride, the metallocene of Chemical Formula 6 (racemic:meso=1:1).

$^1$H NMR (500 MHz, C$_6$D$_6$, 7.24 ppm): 1.19~1.34 (30H, m), 2.22 (6H, s), 2.84 (2H, q), 3.03 (2H, q), 6.79 (2H, s), 7.04 (2H, q), 7.27 (2H, s)

Preparation of Silica-Supported Catalyst Composition

With the exception that the metallocene of Chemical Formula 6 synthesized above was employed, the same procedure as in Comparative Example 3 was repeated to prepare 5 g of a silica-supported catalyst in the form of powder particles with an average diameter of 30 μm.

Comparative Example 8

A polyolefin polymerization catalyst composition was prepared in the same manner as in Comparative Example 3, with the exception that the ansa-metallocene of the following Chemical Formula 7 was employed.

[Chemical Formula 7]

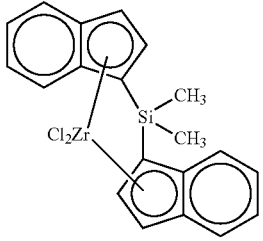

Synthesis of Metallocene

Preparation of (Dimethylsilanediyl-Bisindenyl)Zirconium Dichloride

To a mixture of 44 mL of indene and 150 mL of tetrahydrofuran (THF) was slowly added drops of 215 mL of a methyllithium solution (1.4 M in THF) at 0° C. The reaction mixture was stirred at room temperature for about 2 hrs and then dried in a vacuum. Then, slow addition of 225 mL of a methyllithium solution (1.4 M in THF) at 0° C. was followed by reaction at room temperature for about 1 hrs while stirring. Meanwhile, 40 g of zirconium tetrachloride was introduced to 200 cc of THF at −80° C., and then the temperature was elevated to 25° C. To this a zirconium halide solution was slowly added the indene solution prepared above to allow a reaction therebetween with stirring for 1 hr at 25° C. Thereafter, the oily phase in the reaction mixture was dried for 24 hrs, and the residue was filtered to afford the metallocene of Chemical Formula 7, (dimethylsilanediyl-bisindenyl) zirconium dichloride, as a yellowish solid.

$^1$H NMR (500 MHz, C$_6$D$_6$, 7.26 ppm): 0.54 (6H, s), 5.774 (2H, d), 6.80 (2H, d), 6.86 (2H, t), 7.14 (2H, t), 7.22 (2H, d), 7.33 (2H, d)

Preparation of Silica-Supported Catalyst Composition

With the exception that the metallocene of Chemical Formula 7 synthesized above was used, the same procedure as in Comparative Example 3 was repeated to yield 5 g of a silica-supported metallocene catalyst in the form of powder particles with an average diameter of 30 μm.

Preparation Examples 1 to 4 and Comparative Preparation Examples 1 to 8

Polypropylene polymers were prepared using non-supported heterogeneous polyolefin polymerization catalyst compositions prepared in Examples 1 and 2, and silica-supported metallocene catalysts prepared in Comparative Examples 3 to 8, as follows.

Propylene Polymerization

Bulk polymerization for propylene polymers was carried out in the presence of metallocene catalyst compositions under the conditions set forth in Table 1, below.

Briefly, 3 mmol of triethylaluminum and 1.5 L of propylene were sequentially introduced at room temperature to a 2 L stainless steel reactor which was previously dried in a vacuum at 65° C. and cooled. The reactants were mixed for 10 min by stirring, after which the metallocene catalyst composition prepared in each of Example 1 and 2 and Comparative Examples 3 to 8 was added in an amount of 0.02 g or 0.006 g to the reactor in a nitrogen atmosphere. As needed, hydrogen gas was introduced, together with the metallocene catalyst composition. (refer to Table 1). Subsequently, the temperature of the reactor was slowly elevated to 70° C. at which polymerization was allowed for 1 hr. After completion of the reaction, unreacted propylene monomers were vented.

Measurement was made of contents and activities of the catalysts, and properties of the produced polymers, and data are summarized in Table 1, below.

<Method of Measuring Polymer Properties>

(1) Catalyst activity: weight of the produced polymer (kg PP) per unit amount of the catalyst (g Cat) per unit time (h).

(2) Melting point of polymer (Tm): melting points of polymers were measured using a differential scanning calorimeter (DSC2920, TA Instrument). Briefly, the temperature of a polymer was increased to 220° C. and maintained for 5 min thereat, and then decreased to 20° C. from which the temperature was again elevated. In this regard, the temperature was increased and decreased at a constant rate of 10° C./min.

(3) Crystallization temperature of polymer (Tc): Tc was determined from a curve drawn during the temperature decrease under the same condition as for the melting point.

(4) Stereoregularity of polymer (XI): % weight of the insoluble fraction of the polymer after it was dissolved for 1 hr in boiling ortho-xylene.

Briefly, 200 mL of o-xylene in a flask was filtered through 200 mm No. 4 filter paper. Separately, an aluminum pan was desiccated in an oven for 30 min at 150° C., cooled in a desiccator, and weighed. Then, 100 mL of the filtered o-xylene was pipetted to the aluminum pan which was then heated to 145~150° C. thereby to completely evaporate the o-xylene. Subsequently, the aluminum pan was desiccated in a vacuum at 100±5° C. for 1 hr under a pressure of 13.3 kPa. Then, the aluminum pan was cooled in the desiccator. This procedure was repeated twice to complete a blank test for o-xylene alone, within a weight error of 0.0002 g.

Next, the polypropylene polymers produced using the metallocene catalysts were dried (70° C., 13.3 kPa, 60 min, in a vacuum), and 2 g±0.0001 g of a sample of the polymers cooled in the desiccator was placed in a 500 mL flask to which 200 mL of o-xylene was then introduced. While the flask was continuously supplied with nitrogen and cooling water from external sources by circulation, the o-xylene was refluxed for 1 hr at an elevated temperature. Then, the flask was cooled for 5 min in air to less than 100° C., shaken, and put in a water bath (25±0.5° C.) for 30 min to precipitate the insoluble fraction. The resulting solution having precipitates was filtered through No. 4 extraction paper of 200 mm repetitively until the solution became clear. The filtrate was desiccated at 150° C. for 30 min, and cooled in the desiccator. Of the clear filtrate, 100 mL was placed on the aluminum pan the weight of which was previously measured. The o-xylene was evaporated by heating the aluminum pan at 145~150° C. After completion of the evaporation, the aluminum pan was desiccated in a vacuum at 70±5° C. under a pressure of 13.3 kPa for 1 and cooled in a desiccator. This procedure was repeated twice to measure the weight of the soluble fraction within a weight error of 0.0002 g.

Weight % of the soluble fraction (Xs) of the polymer in o-xylene was calculated according to the following Equation 1, and used to obtain weight % of the insoluble fraction of the polymer as stereoregularity (XI).

$$\text{Stereoregularity}(XI) = 100 - Xs \quad \text{[Equation 1]}$$

$$Xs = \left(\frac{Vbo}{Vb1} \times (W2 - W1) - \frac{Vbo}{Vb2} \times B\right) / Wo \times 100$$

wherein,

Xs=soluble fraction of a polymer in o-xylene (wt %),
Vb0=initial volume of o-xylene (mL),
Vb1=volume of sample taken from the polymer dissolved in o-xylene (mL),
Vb2=volume of o-xylene sample used in the blank test (mL),
W2=weight of the polymer left on the aluminum pan after evaporation of o-xylene plus weight of the aluminum pan itself (g),
W1=weight of the aluminum pan (g),
W0=initial weight of polymer (g),
B=average weight of the residue on the aluminum pan in the blank test (g)

(5) Molecular weight distribution (PDI, polydispersity index) and weight average molecular weight (Mw) of polymer: polymers were measured for weight average molecular weight (Mw) and number average molecular weight (Mn) using gel permeation chromatography (GPC, Waters), with the molecular weight distribution (PDI) calculated by dividing the weight average molecular weight by the number average molecular weight. For this, the molecular weights were measured at 160° C. in trichlorobenzene in normalization to polystyrene.

Polymerization process conditions in Preparation Examples 1 to 3 and Comparative Examples 1 to 7, and properties of the prepared polypropylenes are summarized, together with the catalyst compositions prepared in Examples 1 and 2 and Comparative Examples 3 to 8, in Table 1, below.

TABLE 1

| Preparation Ex. # | Catalyst from | Amount of Cat.(g) | Hydrogen (L) | Yield (g) | Activity (kg/gCat·hr) | Tm (° C.) | Tc (° C.) | Xs (%) | XI (%) | Mw | PDI |
|---|---|---|---|---|---|---|---|---|---|---|---|
| 1 | Ex. 1 | 0.02 | 0 | 259 | 13 | 147 | 105.21 | 1.7 | 98.3 | 376,000 | 1.9 |
| 2 | Ex. 1 | 0.006 | 0.37 | 76.2 | 13.5 | 150.8 | 111.6 | 1.3 | 98.7 | 55,000 | 1.9 |
| 3 | Ex. 2 | 0.02 | 0 | 257 | 10.3 | 147.2 | 106.1 | 1.2 | 98.8 | 382,000 | 2.25 |
| C. 1 | C. Ex. 3 | 0.055 | 0 | 168 | 3.1 | 148.4 | 107.2 | 1.8 | 98.2 | 380,000 | 2.19 |
| C. 2 | C. Ex. 3 | 0.055 | 0.37 | 271 | 5.2 | 150.4 | 109.6 | 1.8 | 98.2 | 76,000 | 2.57 |
| C. 3 | C. Ex. 4 | 0.1 | 0.37 | 0 | — | — | — | ? | — | — | — |
| C. 4 | C. Ex. 5 | 0.1 | 0.37 | 12.3 | 0.12 | 149.1 | 108.3 | 2.0 | 98 | 45,000 | 2.89 |
| C. 5 | C. Ex. 6 | 0.146 | 0 | 80.3 | 0.55 | 152.7 | 112.1 | 0.61 | 99.39 | 608,000 | 1.98 |
| C. 6 | C. Ex. 7 | 0.146 | 0 | 0 | — | — | — | — | — | — | — |
| C. 7 | C. Ex. 8 | 0.146 | 0 | 78.7 | 0.54 | 135.2 | 107.0 | 3.33 | 96.67 | 24,800 | 2.10 |

In Preparation Examples 1 to 3 where non-supported heterogeneous catalyst compositions containing certain ansa-metallocenes and cocatalysts according to Examples 1 and 2 were employed for olefin polymerization, as can be seen in Table 1, the catalyst activity which describes the amount of the polyolefin product per unit weight of catalyst per unit time was measured to be on the order of 10.3 to 13.5 kg/gCat·hr, which was remarkably improved compared to conventional supported catalysts. When 10 wt % methylaluminoxane was dropwise added at a rate of 0.5 cc/min as in Examples 1 and 2, the size of the catalysts could be controlled to a level of as minute as 50 μm, assigning the polymer products with better morphology and a molecular weight distribution of as narrow as 1.90.

In Example 1, dropwise adding of methylaluminoxane to the metallocene catalyst in toluene resulted in controlling the final non-supported heterogeneous catalyst composition to a size of 50 μm. When applied to the production of polypropylenes, this catalyst composition allowed the assignment of better morphology and narrower molecular weight distribution to the polypropylene products. On the other hand, the one-shot addition of methylaluminoxane, as in Example 2, to a solution of metallocene in toluene allowed the assignment of larger diameters to the catalysts. Henceforth, the microstructure of olefin polymers can be readily controlled when they are polymerized in accordance with the present invention.

In Comparative Preparation Examples 1 to 7 where olefin polymerization was conducted using metallocene catalysts supported on silica according to Comparative Examples 3 to 8, the catalyst activity was significantly decreased to 5.2 kg/gCat·hr or less although the production cost of the catalysts increased due to complicated processes for application to the support. Moreover, Comparative Preparation Examples 3 and 6 failed in conducting polymerization processes themselves while the catalyst activity of Comparative Preparation Example 4 dropped to 0.12 kg/gCat·hr.

Compared to Comparative Preparation Example 1 using a support, Preparation Examples 1 to 3 employing non-supported catalysts of Examples 1 and 2 produced polymers excellent in melting point, molecular weight, and stereoregularity without fouling. As for fouling, its occurrence was determined by observing entanglement of the polymers within the reactor with the naked eye. Although not supported, the catalyst compositions of Preparation Examples 1~3 were measured to have properties identical or superior to those of supported catalysts which are currently most widely used.

The non-supported catalysts of Examples 1 and 2 exhibited high activity, compared to the silica-supported catalysts of Comparative Examples 3 to 8. When methylaluminoxane is dropwise added, as in Example 1, the size of the catalyst is controlled to as minute as 50 μm so that the catalyst can more effectively participate in olefin polymerization, guaranteeing uniform size and better morphology to the polymer products, e.g., polypropylenes. Also in view of production time and process, the present invention is advantageous. The non-supported catalysts of Examples 1 and 2 can complete the polymerization within a shorter time and allow the process steps to be simpler than the supported catalysts of Comparative Examples 3 to 8. For example, it takes around 38 hours for the silica-supported catalysts of Comparative Examples 3 to 8 to complete propylene polymerization, which is longer by 11 hours than 27 hours, the time taken by the catalysts of Examples 1 and 2. Further, when the supported catalysts are used, each process step requires five washing rounds, three more than the two washing rounds in each process step of Example 1. Another advantage of the present invention resides in energy efficiency. For example, the reaction in Comparative Examples 3 to 8 starts at 90° C. and then proceeds at 40° C. while all polymerization reactions of Examples 1 and 2 can be conducted at room temperature.

Moreover, considering the phenomenon of Comparison Preparation Examples 5 to 7 in which either fouling occurred or no polymerizations were initiated in the reactor employing as catalysts the metallocenes of Comparative Examples 6 to 8, that is, metallocenes free of the specific substituents according to the present invention, inference can be made of the leakage of the catalysts from the support. These data indicate that the catalytic active moieties of the supported catalyst are not only released from the support during polymerization to provoke fouling within the reactor, but also not completely supported on the support. In contrast, neither catalyst leakage nor fouling was observed in Preparation Examples 1 to 3 using no supports. Although used in a lesser amount, the non-supported catalysts can catalyze the polymerization with higher activity. Particularly, when the cocatalyst is dropwise added, the catalyst product can be more precisely controlled in size, thus allowing the assignment of higher uniform morphology and particle size to the polypropylene products.

The invention claimed is:

1. A non-supported polyolefin polymerization catalyst composition, which is in the form of solid particles with an average diameter of 20 μm to 200 μm, comprising an ansa-metallocene represented by following Chemical Formula 4:

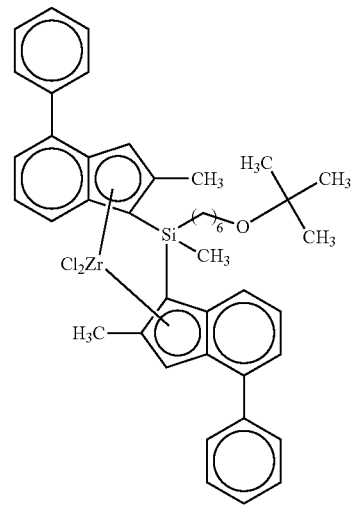

a co-catalyst and represented by following Chemical Formula (2):

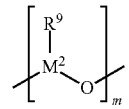

wherein, $M^2$ is a metal element of Group 13 of the Periodic Table; $R^9$'s, which are the same or different, are independently C1 to C20 alkyl, C2 to C20 alkenyl, C7 to C20 alkylaryl, C7 to C20 arylalkyl, or C6 to C20 aryl; and m is an integer of 2 or larger; and wherein transition metal element, Zr, of the ansa-metallocene and the metal element ($M^2$) of the cocatalyst are used at a molar ratio ($M^2$/Zr) of 300 to 450, and wherein the polyolefin polymerization is bulk polymerization for preparing propylene polymers.

2. The non-supported polyolefin polymerization catalyst composition of claim 1, wherein the ansa-metallocene is crosslinked with at least a part of the cocatalyst via a Lewis acid/base bond.

3. The non-supported polyolefin polymerization catalyst composition of claim 2, further comprising the cocatalyst by itself before forming the Lewis acid/base bond with the ansa-metallocene.

4. The non-supported polyolefin polymerization catalyst composition of claim 2, wherein the O-t-butyl group of the ansa-metallocene of Chemical Formula 4 is crosslinked with the cocatalyst via a Lewis acid/base bond.

5. The non-supported polyolefin polymerization catalyst composition of claim 1, wherein $R^9$'s are independently methyl, ethyl, propyl, isopropyl, isopropenyl, n-butyl, sec-butyl, tert-butyl, pentyl, hexyl, octyl, decyl, dodecyl, tridecyl, tetradecyl, pentadecyl, hexadecyl, octadecyl, eicosyl, docosyl, tetracosyl, cyclohexyl, cyclooctyl, phenyl, tolyl, or ethylphenyl; m is an integer of 6 to 300; and $M^2$ is aluminum.

6. The non-supported polyolefin polymerization catalyst composition of claim 2, wherein the crosslinking bond of the ansa-metallocene and the cocatalyst is formed as shown in the following Chemical Formula A:

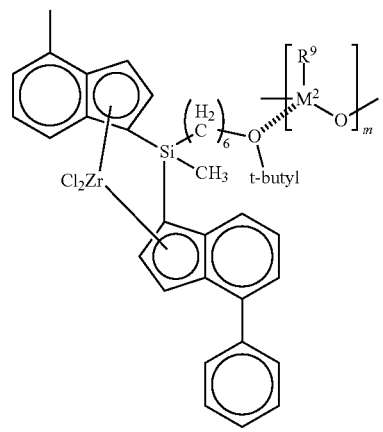

Chemical Formula A wherein, $M^2$ is a metal element of Group 13 of the Periodic Table; $R^9$'s, which are the same or different, are independently C1 to C20 alkyl, C2 to C20 alkenyl, C7 to C20 alkylaryl, C7 to C20 arylalkyl, or C6 to C20 aryl; and m is an integer of 2 or larger.

* * * * *